(12) United States Patent
Dehnie et al.

(10) Patent No.: US 8,922,427 B2
(45) Date of Patent: Dec. 30, 2014

(54) METHODS AND SYSTEMS FOR DETECTING GPS SPOOFING ATTACKS

(75) Inventors: Sintayehu Dehnie, Bexley, OH (US); Reza Ghanadan, Berkley Heights, NJ (US)

(73) Assignee: BAE Systems Information and Electronic Systems Integration Inc., Nashau, NH (US)

( * ) Notice: Subject to any disclaimer, the term of this patent is extended or adjusted under 35 U.S.C. 154(b) by 778 days.

(21) Appl. No.: 13/135,238

(22) Filed: Jun. 29, 2011

(65) Prior Publication Data

US 2013/0002477 A1 Jan. 3, 2013

(51) Int. Cl.
*G01S 19/20* (2010.01)
*G01S 19/47* (2010.01)
*G01C 21/10* (2006.01)
*G01S 19/21* (2010.01)

(52) U.S. Cl.
CPC .............. *G01S 19/47* (2013.01); *G01S 19/215* (2013.01)
USPC .................... 342/357.58; 342/357.3; 701/500

(58) Field of Classification Search
USPC ................. 342/357.3, 357.32, 357.4, 357.58; 701/468, 500
See application file for complete search history.

(56) References Cited

U.S. PATENT DOCUMENTS

| | | | |
|---|---|---|---|
| 5,557,284 | A | 9/1996 | Hartman |
| 2007/0096977 | A1 | 5/2007 | Lillo et al. |
| 2009/0167597 | A1 | 7/2009 | Strachan |
| 2009/0254278 | A1 | 10/2009 | Wang |

FOREIGN PATENT DOCUMENTS

WO 2010105136 9/2010

OTHER PUBLICATIONS

Abraham Wald, "Sequential Analysis," "Chapter 3. The Sequential Probability Ratio Test for Testing a simple Hypothesis $H_0$ Against a Single Alternative $H_1$," Dover Publications, 1947, pp. 36-57.
A. Ju, "Researchers raise uncomfortable questions by showing how GPS navigation devices can be duped," Chronicle Online, Cornell University, Sep. 19, 2008: http://www.news.cornell.edu/stories/Sept08/GPSSpoofing.aj.html, 2 pages.
Jon S. Warner and Roger G. Johnston, "GPS Spoofing Countermeasures," Los Alamos National Laboratory, Los Alamos, New Mexico, research paper LAUR-03-6163, Dec. 2003, 8 pages.
Paul Y. Montgomery, Todd E. Humphreys, and Brent M. Ledvina, "A Multi-Antenna Array Defense Receiver-Autonomous GPS Spoofing Detection," InsideGNSS, Engineering Solutions from the Global Navigation Satellite Systems Community, Mar./Apr. 2009. pp. 40-46.
Sherman Lo, David De Lorenzo, Per Enge, Dennis Akos, and Paul Bradley, "Signal Authentication: A Secure Civil GNSS for Today," InsideGNSS, Engineering Solutions from the Global Navigation Satellite Systems Community, Sep./Oct. 2009, pp. 30-39.
Sintayehu Dehnie and Nasir Memon, "Modeling Misbehavior in Cooperative Diversity: A Dynamic Game Approach," EURASIP Journal on Advances in Signal Processing, vol. 2009, Article ID 927140, 2009, doi:10.1155/2009/927140, pp. 1-12.

(Continued)

*Primary Examiner* — Dao Phan
(74) *Attorney, Agent, or Firm* — Daniel J. Long

(57) ABSTRACT

A system and method for detecting global positioning system (GPS) spoofing attacks includes collecting GPS readings along with inertial navigational system (INS) readings as a ground truth, and sequentially testing the GPS readings and INS readings through the use of a sequential probability ratio testing (SPRT) process.

22 Claims, 2 Drawing Sheets

(56) References Cited

OTHER PUBLICATIONS

S. Dehnie, S. Tomasin, R. Ghanadan, "Sequential Detection of Misbehaving Nodes in Cooperative Networks with HARQ," in Proc. MILCOM' 09 Boston, MA, Oct. 2009, 7 pages.

S. Dehnie, K. Guan, L. Gharai, R. Ghanadan, S. Kumar, "Reliable Data Fusion in Wireless Sensor Networks: A Dynamic Bayesian Game Approach," in Proc. MILCOM'09, Boston MA, Oct. 2009, 7 pages.

Kyle Guan, Sintayehu Dehnie, L. Gharai, Reza Ghanadan, Srikanta Kumar, "Trust management for Distributed Decision Fusion in Sensor Networks," Proc. FUSION'09, Jul. 2009, pp. 1933-1941.

METHODS AND SYSTEMS FOR DETECTING GPS SPOOFING ATTACKS

FIELD OF THE INVENTION

The present invention relates to tactical information networks, and more particularly to methods and systems for detecting, identifying and mitigating GPS spoofing attacks.

BACKGROUND OF THE INVENTION

Next generation tactical systems including Blue Force Tracking (BFT), Soldier Radio Waveform (SRW)-based and Wideband Networking Waveform (WNW)-based Joint Tactical Radio System (JTRS), tactical unattended wireless sensors networks, and distributed electronic warfare (EW) systems, rely heavily on the global positioning system (GPS) for time synchronization and basic operation. These networks are highly susceptible to GPS spoofing attacks. GPS spoofing attack is a technique by which a GPS receiver is tricked into trusting fake GPS signals. Actual GPS signals are fairly weak satellite signals that provide a GPS node with it coordinates.

A typical technique used by malicious entities is to reproduce another fake GPS signal in the vicinity of the victim GPS node. The GPS node, upon receiving this fake signal determines it is an authentic satellite signal and updates its localization or time information. Thus, GPS spoofing is a covert attack that has severe consequences. Since GPS receivers cannot detect fake GPS signals, they can be fooled into tracking erroneous data. In 2003, researchers at Los Alamos National Laboratory demonstrated the capacity for an adversary to launch GPS spoofing attacks using commercially available GPS simulators.

Recently, researchers at Cornell University developed a portable civilian GPS spoofing device and demonstrated how a GPS receiver can easily be fooled or spoofed. In effect, simulator nodes that can reproduce GPS signals are readily available for sale in the commercial market. Known methods for combating such attacks include spoofing counter measures based on GPS signal characteristics and multi-antenna array GPS defense.

Unfortunately, anti-spoofing based on GPS signal strength measurement fails to detect sophisticated GPS spoofing devices that mimic signal characteristics of the GPS. A multi-antenna array works well only in static GPS receivers but not in dynamic environments where the GPS receiver is mobile. In addition, multi-antenna GPS array are costly and require greater size, weight and power (SwaP) needs.

The current art is not sufficiently robust in terms of reliability and effectiveness since the detection technique relies on properties of the GPS signal or is optimized to mitigate a GPS spoofing attack on static GPS receivers. Other techniques operate to detect a GPS spoofing attack using a signal received at a remote site as a reference. In general, in the current art decision is based on a single instance of protocol violation. The mitigation technique, in the current art, is effective protecting static GPS receivers against GPS spoofing attacks. Therefore, such techniques are generally ineffective against attacks on body or vehicle mounted GPS receivers where the environment is dynamic.

Accordingly, there is a need in the art for methods and systems adapted for detecting GPS spoofing attacks in both static and dynamic settings. There is a further need for such methods and systems requiring minimum amount of information, both content and observation time, for convergence in order to provide reliable detection and mitigation of GPS spoofing attacks.

SUMMARY OF THE INVENTION

The present invention relates to method and system for detecting GPS spoofing attacks. Specifically, there is provided a collaborative approach through corresponding software analysis for detecting and mitigating GPS spoofing attacks in an information network. The present invention can be employed as monitoring nodes for detecting the presence or absence of spoofed GPS signals in the information network. The system includes an inertial navigation system for providing ground truth. The present invention utilizes a combination of information acquired from GPS-based and INS-based devices to accurately detect the presence of a GPS spoofing signals via binary hypothesis testing process such as, for example, sequential probability ratio test (SPRT). The present invention can also be configured to detect a spoofed signal by constructing a trusted signature built through continuous monitoring of the GPS signal. Any significant deviation from this signature signals the presence of a spoofed GPS signal.

The seriousness of a GPS spoofing attack on information networks that rely on GPS for their proper operation has raised the need for the present invention, due to the limitation of existing techniques to effectively detect and identify GPS spoofing attacks. The method and system of the present invention provides improved accuracy, enhanced efficiency in information content and processing, reduced detection delay resulting in improved detection speed, reduced network overhead and coordination at lower costs and reduced size, weight and power (SwaP) needs.

In one aspect of the present invention there is provided a method for detecting a global positioning system (GPS) spoofing attack in connection with a GPS receiver, which comprises:

providing a GPS receiver and an inertial navigational system (INS) device operatively associated with said GPS receiver;

collecting sequentially a series of navigational data comprising a GPS reading from the GPS receiver and INS reading from the INS device at periodic intervals; and statistically analyzing via hypothesis testing the GPS and INS readings of the corresponding navigational data until either a statistically significant difference between the GPS and INS readings can be determined to signal the presence of a GPS spoofing attack, or the difference between the GPS and INS readings are statistically about the same to signal the absence of a GPS spoofing attack.

In a further aspect of the present invention, there is provided a method for detecting a global positioning system (GPS) spoofing attack in connection with a GPS receiver, which comprises:

(a) providing a GPS receiver and an inertial navigational system (INS) device operatively associated with said GPS receiver;

(b) selecting a lower detection threshold corresponding to a first statistical significance level wherein a GPS spoofing attack is deemed absent, and a higher detection threshold corresponding to a second statistical significance level wherein a GPS spoofing attack is deemed present;

(c) collecting sequentially a series of navigational data comprising a GPS reading from the GPS receiver and INS reading from the INS device at periodic intervals;

(d) determining a test statistic from each navigational data collected at each interval;

(e) determining a probability value from each of the test statistics; and (f) comparing the probability value corresponding to each test statistic with the lower detection threshold and the higher detection threshold, respectively, until an outcome corresponding to the presence or absence of a GPS spoofing attack can be established.

In another aspect of the present invention there is provided a system for detecting a global positioning system (GPS) spoofing attack in connection with a GPS receiver, which comprises:

a GPS receiver and an inertial navigational system (INS) device operatively associated with said GPS receiver; and a central processor operatively connected to the GPS receiver and INS device, said central processor being programmed to perform the steps of:

collecting sequentially a series of navigational data comprising a GPS reading from the GPS receiver and INS reading from the INS device at periodic intervals; and statistically analyzing via hypothesis testing the GPS and INS readings of the corresponding navigational data until either a statistically significant difference between the GPS and INS readings can be determined to signal the presence of a GPS spoofing attack, or the difference between the GPS and INS readings are statistically about the same to signal the absence of a GPS spoofing attack.

BRIEF DESCRIPTION OF THE DRAWINGS

The following drawings are illustrative of embodiments of the present invention, and are not intended to limit the invention as encompassed by the claims forming part of the application.

DETAILED DESCRIPTION OF THE INVENTION

Figure 1:
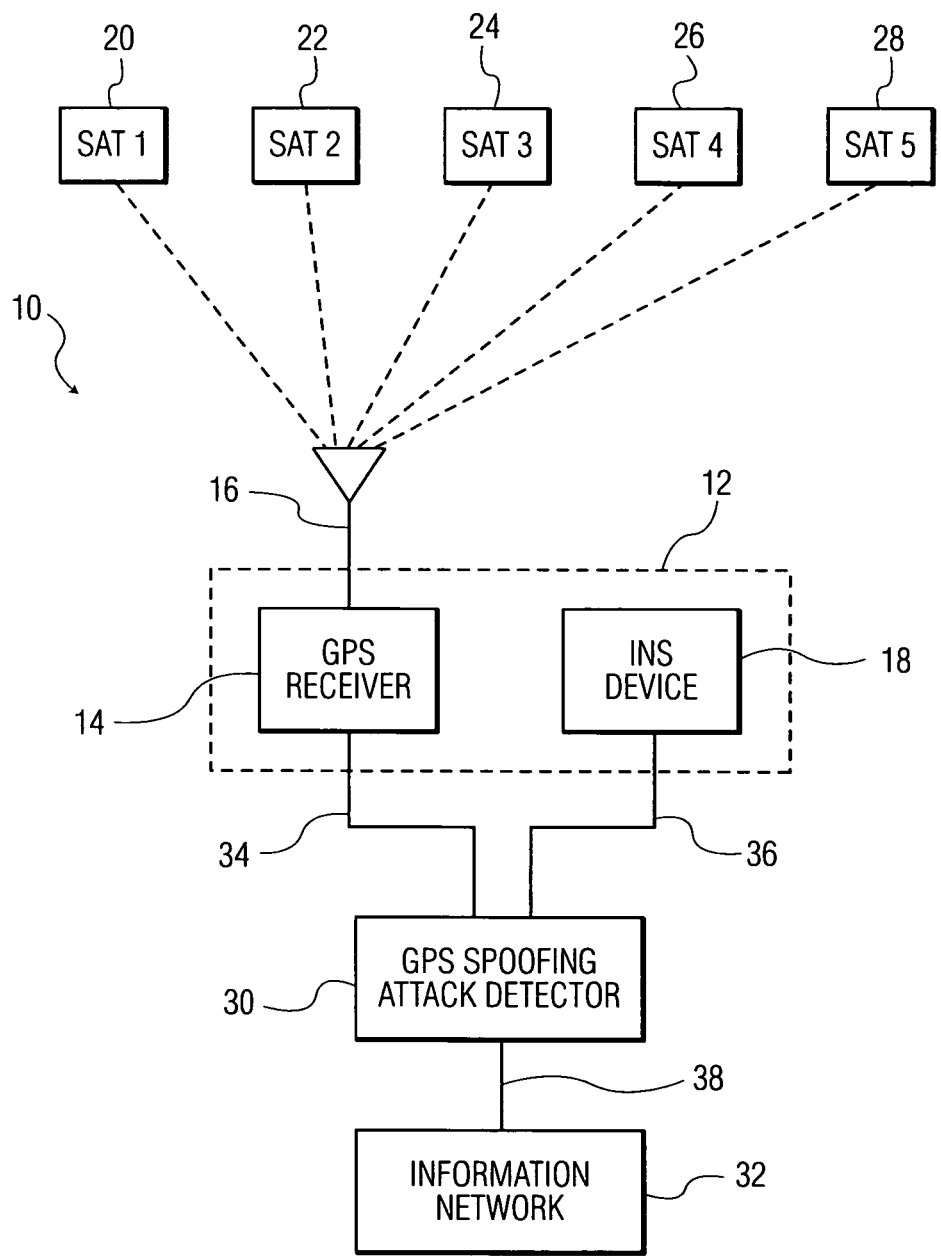
FIG. 1 is a schematic diagram showing a GPS spoofing detection system implemented in accordance with one embodiment of the present invention.

Various embodiments of the invention are described using various known acronyms, and definitions thereof, which are provided immediately below.

The term "global positioning system (GPS)" as used herein is intended to refer to a space-based global navigation system, comprising multiple GPS satellites as configured to continually transmit messages as they orbit the Earth, and a GPS receiver which calculates its position by precisely timing the signals sent by the GPS satellites. In this manner, a user with a GPS receiver is able to receive reliable location and time information in all weather and at all times and anywhere on or near the Earth when and where there is an unobstructed line of sight to four or more GPS satellites.

The term "inertial navigation system (INS)" as used herein is intended to refer to any navigational aid adapted to provide information on position, orientation and velocity of a navigational unit without the need for external references. The INS navigation aid typically uses a computer, motion sensors (i.e., accelerometers) and rotation sensors (i.e., gyroscopes) or other motion sensing devices for continually updating the position and velocity of the navigational unit after receiving the initial position and velocity information from a source (e.g., GPS receiver).

The term "navigational unit" as used herein is intended to refer to an individual, group, machine or vehicle, which may be stationary (i.e., static location) or mobile (i.e., traveling from one location to another). In the present invention, the navigational unit outfitted with a GPS receiver through which the location and timing information is generated on a continuous basis. The location and timing information can be transmitted to a centralized computer as part of an information network for tracking or monitoring the navigational unit.

The term "information network" as used herein is intended to refer to a communication network comprising at least one computer (e.g., central office, command center) for receiving and displaying location information from one or more GPS receivers to track or monitor associated navigational units.

The term "GPS spoofing attack" as used herein is intended to refer to any act where a GPS receiver of a navigational unit is fed false information via a GPS spoofing signal transmitted from a GPS spoofing device or GPS satellite simulator at a higher strength than the true GPS signal. As a result, the "spoofed" GPS receiver, utilizing the false signal, computes erroneous time or location information. In an information network setting, the erroneous time or location information may be transmitted from the spoofed GPS receiver to the information network, thus adversely compromising the tracking or monitoring of the affected navigational unit.

The present invention is generally directed to method and system for detecting, identifying and mitigating GPS spoofing attacks. The system of the present invention includes a navigational unit having a global positioning system (GPS) receiver in communication with one or more global navigation satellites to provide the location and time information of the navigational unit and an inertial navigation system (INS) device adapted for determining the position, orientation and velocity of the navigational unit in the absence of external references, and a GPS spoofing detector in communication with the GPS receiver and INS device. The GPS spoofing detector is adapted to detect a spoofed GPS signal through use of a binary hypothesis testing process.

The present invention provides a simple, reliable and robust detector, and can be used in tactical networks including, but not limited to, intelligence, surveillance and reconnaissance (ISR) networks for ensuring reliable operation and situational awareness, Blue Force Tracking (BFT) systems for reducing incidents of friendly fire, electronic warfare (EW) systems for maintaining reliable electronic attack and support operations, and other network-centric operations for enhanced effectiveness.

The method and system of the present invention employs inertial navigation system (INS)-based devices to provide relative navigational information. The navigational information provided by the INS-based device is used as a ground truth to recognize the presence or absence of a GPS spoofing attacks. INS devices have been used as navigation aid to provide information on position, orientation and velocity of a moving object without the need for external references, thus such INS-based devices are immune to interference and spoofing. The INS-based devices are deployed in a distributed manner in a communications system or information network that relies on GPS for time synchronization, geo-location and basic operation.

It is also proposed herein that the present invention in the form of collaborative software agents can be arranged as a set of distributed monitoring nodes to monitor received GPS signals to determine the presence or absence of malicious information (i.e., GPS spoofing signals). Each monitoring node will use local INS measurement as side information to detect malicious navigational information (i.e., GPS spoofing signals) in a locally received GPS signal. In a preferred embodiment of the present invention, the detection technique is based on the optimal sequential probability ratio test (SPRT).

In one embodiment of the present invention, there is provided a method for detecting a global positioning system (GPS) spoofing attack in connection with a GPS receiver, which comprises providing a GPS receiver and an inertial navigational system (INS) device operatively associated with said GPS receiver, collecting sequentially a series of navigational data comprising a GPS reading from the GPS receiver and INS reading from the INS device at periodic intervals, and statistically analyzing via hypothesis testing the GPS and INS readings of the corresponding navigational data until either a statistically significant difference between the GPS and INS readings can be determined to signal the presence of a GPS spoofing attack, or the difference between the GPS and INS readings are statistically about the same to signal the absence of a GPS spoofing attack.

In reference to FIG. 1, a system 10 for detecting, identifying and mitigating GPS spoofing attacks is shown for one embodiment of the present invention. The system 10 includes a navigational unit 12 having a GPS signal receiver 14 equipped with a GPS antenna 16 and an INS device 18. The navigational unit 12 can be an individual user, a ground vehicle, an aircraft, a ship, spacecraft, guided missile, remotely controlled drone and the like. The GPS antenna 16 is configured for receiving GPS satellite information signals from space-based GPS satellites 20, 22, 24, 26, and 28. The GPS receiver 14 continuously listens for the GPS signals from the GPS satellites 20, 22, 24, 26 and 28, and locks onto their signals simultaneously.

The GPS receiver 14 is able to distinguish which GPS satellites 20, 22, 24, 26 and 28 are transmitting the GPS signal and their respective location in space at any given time. The GPS receiver 14 calculates the distance from each GPS satellite 20, 22, 24, 26 or 28 based on the time it takes to receive the respective GPS signal. The GPS receiver 14, obtaining GPS signals from multiple GPS satellites 20, 22, 24, 26 and 28 simultaneously, knows the position and the distance to each of them at any given time. From this information, the GPS receiver 14, using known triangulation techniques, computes the position of the navigational unit 12 on the surface of the Earth.

The INS device 18 comprises at least one computer and a platform containing motion sensors (e.g., accelerometers) and rotational sensors (e.g., gyroscopes) to continuously calculate via dead reckoning the position, orientation, and velocity of the navigational unit 12. The INS device 18 is initially provided with the position and velocity from another source such as a human operator, and thereafter computes updated position and velocity through integration of information received from the sensors.

The system 10 further includes a GPS spoofing attack detector 30 adapted for receiving navigational information readings from the GPS receiver 14 via communication link 34; and the INS device 18 via communication link 36, respectively. The GPS spoofing attack detector 30 may be located locally with the navigational unit 12 or remotely at a central office or command center. The detector 30 is connected to an information network 32 via communication link 38. The communication links 34, 36 and 38 can be configured as a wireless link or a hardwire connection.

It is noted that the detector 30 may be a computer configured with a central processor (not shown) in communication with inputs for receiving readings from the GPS receiver 14 and the INS device, respectively, a storage device (not shown) for storing a software program for execution by the central processor to implement the method of the present invention, and a network interface (not shown) in communication with the information network 32 through which a signal corresponding to the presence or absence of a GPS spoofing attack is conveyed.

The navigational information readings from the GPS receiver 14 are transmitted continuously to the information network 32 for tracking and monitoring. The GPS spoofing attack detector 30 monitors the navigational information readings from the GPS signal receiver 14 to detect malicious navigational information. The detector 30 samples the GPS navigational information readings along with the corresponding INS navigational information readings for analysis using binary hypothesis testing which may be implemented through a software program stored and executed in the detector 30. The detector 30 performs an ongoing statistical analysis that is repeatedly conducted as the navigational information readings from the GPS receiver 14 and the INS device 18, respectively, is collected. The GPS and INS navigational information readings are repeatedly assessed after each sample, observation or collection interval until a decision can be reached.

Preferably, the binary hypothesis testing is based on the optimal sequential probability ratio test (SPRT). SPRT provides a detection technique that yields minimum detection delay for a given error rate. It is optimal in that it utilizes minimum amount of information to make a reliable decision. In this manner, SPRT requires minimum content and time to provide reliable detection with optimal latency. Unlike optimal block detection techniques that guarantee either an acceptable false alarm (FA) probability or miss detection (MD) probability, SPRT guarantees both bounded FA and MD probabilities with low complexity and low memory requirement.

The SPRT sets threshold boundaries or detection thresholds where one of which represents one outcome (i.e., attack present), and the other a significantly different outcome (i.e., attack not present). When the value of a calculated test statistic falls outside of these threshold boundaries, a conclusion can be drawn and data collection stops.

Figure 2:
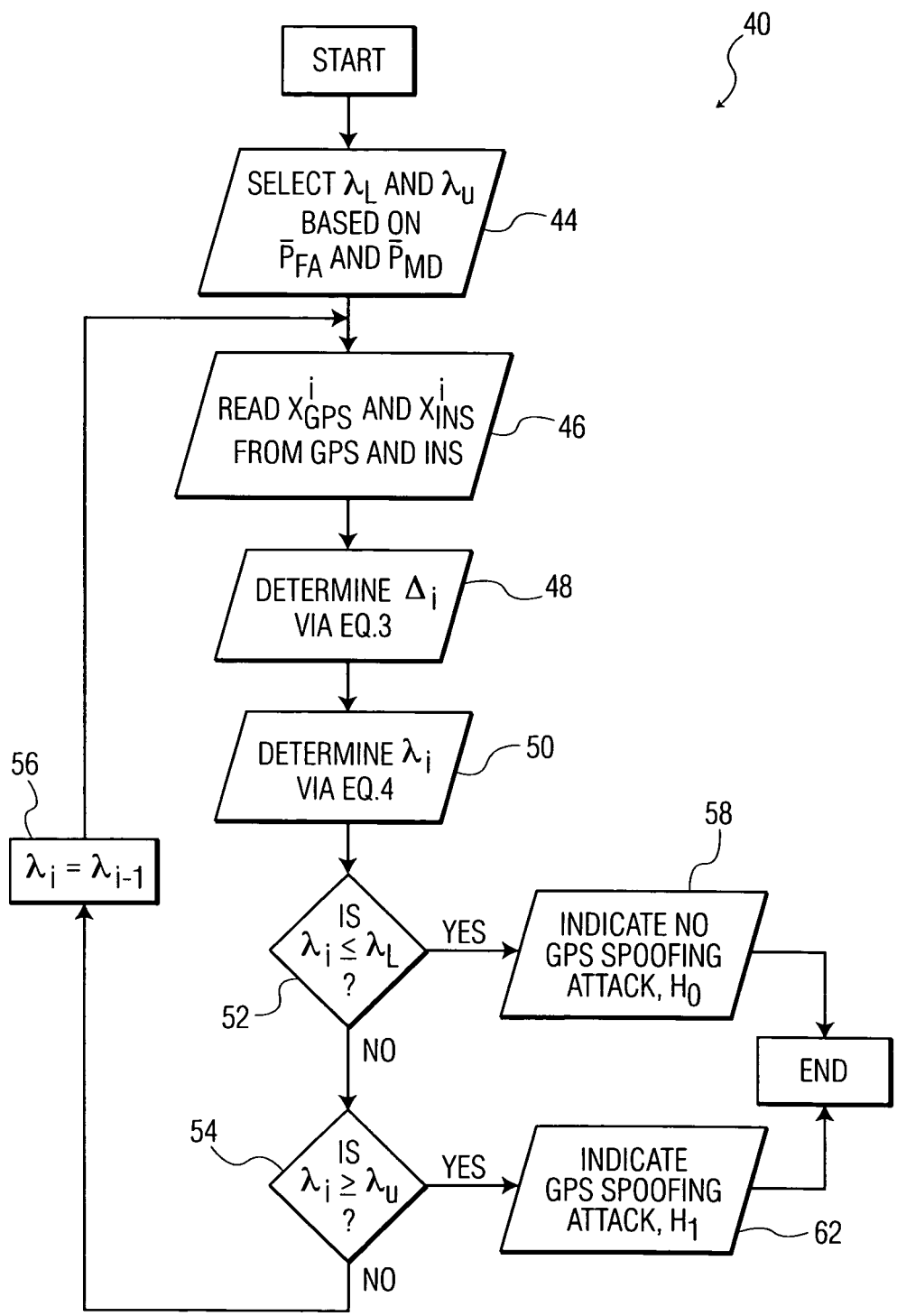
FIG. 2 is a flowchart diagram showing a method utilizing sequential probability ratio test (SPRT) for detecting, identifying and mitigating GPS spoofing attacks in accordance with the present invention.

Referring to FIG. 2, the central processor of the detector 30 is programmed to implement a method 40 using SPRT analysis where the binary hypothesis is defined as follows in Table 1.

TABLE 1

| Hypothesis | Decision/Outcome |
|---|---|
| $H_0$ | Absence of a GPS Spoofing attack recognized |
| $H_1$ | Presence of a GPS Spoofing attack recognized |

In step 44, a lower detection threshold ($\lambda_L$) corresponding to a first statistical level is selected in connection with the null hypothesis ($H_0$), and an upper detection threshold ($\lambda_U$), corresponding to a second statistical level is selected in connection with the alternative hypothesis ($H_1$). The threshold selection is made to reflect the acceptable probabilities of false alarm ($\overline{P}_{FA}$) events and miss detection ($\overline{P}_{MD}$) events, respectively. The lower and upper detection thresholds are selected to satisfy the following conditions on error probabilities where $P_{FA} \leq \overline{P}_{FA}$ and $P_{MD} \leq \overline{P}_{MD}$, respectively. The lower detection threshold is computed off-line via the following approximate equation (1):

$$\lambda_L = \log\frac{\overline{P}_{MD}}{1 - \overline{P}_{FA}} \quad (1)$$

The upper detection threshold is computed off-line via the following approximate equation:

$$\lambda_U = \log\frac{1 - \overline{P}_{MD}}{\overline{P}_{FA}} \quad (2)$$

In step 46, the central processor of the detector 30 receives from the GPS receiver 14, and the INS device 18, the navigational information readings $(X_{GPS}^i)$ and $(X_{INS}^i)$ at the time instant, i, respectively. In step 48, the central processor determines a test statistic value $(\Delta_i)$ based on the difference of $(X_{GPS}^i)$ and $(X_{INS}^i)$ at the time instant, i, respectively, via equation (3).

$$\Delta_i = |X_{GPS}^i - X_{INS}^i| \quad (3)$$

In step 50, the central processor computes a cumulative sum of the log-likelihood ratio $(\lambda_i)$ based on the test statistic $(\Delta_i)$ via equation (4).

$$\lambda_i = \lambda_{i-1} + \frac{\log(P(\Delta_i \mid H_1))}{P(\Delta_i \mid H_0)} \quad (4)$$

wherein:

$\lambda_{i-1}$ represents the test statistic of the navigational data from previous collection interval, $H_0$ represents the hypothesis where a GPS spoofing attack is absent, $H_1$ represents the hypothesis where a GPS spoofing attack is present, $P(\Delta_i|H_o)$ represents the probability distribution of $\Delta_i$ hypothesis $H_0$, and $P(\Delta_i|H_1)$ represents the probability distribution of $\Delta_i$ under hypothesis $H_1$.

Since the detection metric defined in equation (3) captures the measurement error, it can be approximated using Gaussian distribution techniques. Under both hypothesis, the resulting detection metric is Gaussian. However, the parameters of the distribution under the two hypothesis are different which provides the basis for determining the presence or absence of a spoofed GPS signal. The probability distribution $P(\Delta_i|H_0)$ is estimated to obtain the parameter as mean and variance. Thus, deviation from the parameters under the null hypothesis signals the presence of a GPS spoofing attack. To determine the presence or absence of a GPS spoofing attack, the central processor compares $(\lambda_i)$ with two thresholds $(\lambda_L)$ and $(\lambda_U)$ in steps 52 and 54. The possible outcomes are shown in Table 2 below.

TABLE 2

| Condition | Decision/Outcome |
| --- | --- |
| $\lambda_i \leq \lambda_L$ | Recognize absence of a GPS spoofing attack |
| $\lambda_i \geq \lambda_U$ | Recognize presence of a GPS spoofing attack |
| $\lambda_i \in (\lambda_L, \lambda_U)$ | Continue monitoring |

In step 52, the central processor compares the cumulative sum of the log-likelihood ratio $(\lambda_i)$ to the lower detection threshold $(\lambda_L)$ and determines whether $\lambda_i \leq \lambda_L$ is true. If the query is affirmative, the central processor proceeds to step 58 where the detector 30 signals the information network 32 that no GPS spoofing attack is present and the process is terminated. If the query is negative, the central processor compares the cumulative sum of the log-likelihood ratio $(\lambda_i)$ to the upper detection threshold $(\lambda_L)$ and determines whether $\lambda_i \geq \lambda_U$ is true.

If the query is affirmative, the central processor proceeds to step 62 where the detector 30 signals the information network 32 that a GPS spoofing attack is present and the process is terminated. If the query is negative, the central processor changes the $(\lambda_{i-1})$ to $(\lambda_{i-1})$, and proceeds back to step 46 where new navigational information readings $(X_{GPS}^i)$ and $(X_{INS}^i)$ at the time instant, i, respectively, are obtained for calculating a new cumulative sum of the log-likelihood ratio $(\lambda_i)$ for continued monitoring.

A plurality of detectors 30 can be used in a distributed arrangement where each corresponds to a navigational unit 12. The distributed detectors 30 can exchange their local decisions to form a global consensus on the presence or absence of a GPS spoofing attack. Exchange of local decisions enhances robustness of the detection technique.

The INS navigational informational readings provide ground truth to identify error in position or orientation, reliable detection with high probability of spoofed position and spoofed time measurement in a received GPS signal. Alternatively the detectors 30 can be adapted to also detect GPS spoofing signals by constructing a trusted signature built through continuous monitoring the received GPS signal. Deviation from the signature signals the presence of spoofed GPS signal. This can be implemented by combining the output of the sequential detector and past history of the GPS node to obtain a probabilistic measure for the trustworthiness of the GPS node.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

Although the foregoing description makes use of a tactical information network, it will be understood that this aspect is provided only as an example and not as a limitation. It is important to note that the methods illustrated in the present discussion can be implemented for use in any network system. The invention is applicable to other systems of wireless communication and also other mobile and fixed wireless sensor network systems that rely on the Global Positioning System. Those of ordinary skill in the art will recognize other variations and modifications consistent with the invention.

What is claimed is:

1. A method for detecting a global positioning system (GPS) spoofing attack in connection with a GPS receiver, comprising:

providing a GPS receiver and an inertial navigational system (INS) device operatively associated with said GPS receiver;

collecting sequentially a series of navigational data comprising a GPS reading from the GPS receiver and INS reading from the INS device at periodic intervals; and statistically analyzing via hypothesis testing the GPS and INS readings of the corresponding navigational data until either a statistically significant difference between the GPS and INS readings can be determined to signal the presence of a GPS spoofing attack, or the difference between the GPS and INS readings are statistically the same to signal the absence of a GPS spoofing attack.

2. The method of claim 1, wherein the analyzing step comprises:
selecting a lower detection threshold corresponding to a first statistical significance level wherein a GPS spoofing attack is deemed absent, and a higher detection threshold corresponding to a second statistical significance level wherein a GPS spoofing attack is deemed present;
determining a test statistic from each navigational data collected at each interval;
determining a probability value from each of the test statistics; and
comparing the probability value corresponding to each test statistic with the lower detection threshold and the higher detection threshold, respectively, until an outcome corresponding to the presence or absence of a GPS spoofing attack can be established.

3. The method of claim 2, wherein one of the outcomes comprises:
continuing the collection of navigational data under the condition that the test statistic is less than the upper statistical significance level, and greater than the lower statistical significance level.

4. The method of claim 2, wherein one of the outcomes comprises:
terminating the collection of navigational data; and
signaling the presence of a GPS spoofing attack under the condition that the test statistic is greater than or equal to the upper statistical significance level.

5. The method of claim 2, wherein one of the outcomes comprises:
terminating the collection of navigational data; and
signaling the absence of a GPS spoofing attack under the condition that the test statistic is lesser than or equal to the lower statistical significance level.

6. The method of claim 1, wherein the hypothesis test is a sequential probability ratio test.

7. The method of claim 2, wherein the test statistic ($\Delta_i$) is determined using Eq. (3) as follows, $$\Delta_i = |X_{GPS}^i - X_{INS}^i| \qquad (3)$$

wherein:
$X_{GPS}^i$ represents the GPS reading from the GPS receiver; and
$X_{INS}^i$ represents the INS reading from the INS device.

8. The method of claim 2, wherein the probability value is a cumulative sum of log-likelihood ratio ($\lambda_i$), said cumulative sum of log-likelihood ratio ($\lambda_i$) being determined using Eq. (4) as follows, $$\lambda_i = \lambda_{i-1} + \frac{\log(P(\Delta_i \mid H_1))}{P(\Delta_i \mid H_0)} \qquad (4)$$

wherein,
$\lambda_{i-1}$ represents the test statistic of the navigational data from previous collection interval,
$H_0$ represents the hypothesis where GPS spoofing attack is absent,
$H_1$ represents the hypothesis where GPS spoofing attack is present,
$P(\Delta_i \mid H_o)$ represents the probability distribution of $\Delta_i$ under hypothesis $H_0$, and
$P(\Delta_i \mid H_1)$ represents the probability distribution of $\Delta_i$ under hypothesis $H_1$.

9. A method for detecting a global positioning system (GPS) spoofing attack in connection with a GPS receiver, comprising:
(a) providing a GPS receiver and an inertial navigational system (INS) device operatively associated with said GPS receiver;
(b) selecting a lower detection threshold corresponding to a first statistical significance level wherein a GPS spoofing attack is deemed absent, and a higher detection threshold corresponding to a second statistical significance level wherein a GPS spoofing attack is deemed present;
(c) collecting sequentially a series of navigational data comprising a GPS reading from the GPS receiver and INS reading from the INS device at periodic intervals;
(d) determining a test statistic from each navigational data collected at each interval;
(e) determining a probability value from each of the test statistics;
(f) comparing the probability value corresponding to each test statistic with the lower detection threshold and the higher detection threshold, respectively, until an outcome corresponding to the presence or absence of a GPS spoofing attack can be established.

10. The method of claim 9, wherein one of the outcomes comprises:
continuing the collection of navigational data under the condition that the test statistic is less than the upper statistical significance level, and greater than the lower statistical significance level.

11. The method of claim 9, wherein one of the outcomes comprises:
terminating the collection of navigational data; and
signaling the presence of a GPS spoofing attack under the condition that the test statistic is greater than or equal to the upper statistical significance level.

12. The method of claim 9, wherein one of the outcomes comprises:
terminating the collection of navigational data; and
signaling the absence of a GPS spoofing attack under the condition that the test statistic is lesser than or equal to the lower statistical significance level.

13. The method of claim 9, wherein the test statistic ($\Delta_i$) is determined using Eq. (3) as follows, $$\Delta_i = |X_{GPS}^i - X_{INS}^i| \qquad (3)$$

wherein:
$X_{GPS}^i$ represents the GPS reading from the GPS receiver; and
$X_{INS}^i$ represents the INS reading from the INS device.

14. The method of claim 9, wherein the probability value is a cumulative sum of log-likelihood ratio ($\lambda_i$), said cumulative sum of log-likelihood ratio ($\lambda_i$) being determined using Eq. (4) as follows, $$\lambda_i = \lambda_{i-1} + \frac{\log(P(\Delta_i \mid H_1))}{P(\Delta_i \mid H_0)} \qquad (4)$$

wherein,
$\lambda_{i-1}$ represents the test statistic of the navigational data from previous collection interval, $H_0$ represents the hypothesis where GPS spoofing attack is absent, $H_1$ represents the hypothesis where GPS spoofing attack is present, $P(\Delta_i | H_o)$ represents the probability distribution of $\Delta_i$ under hypothesis $H_0$, and $P(\Delta_i | H_1)$ represents the probability distribution of $\Delta_i$ under hypothesis $H_1$.

15. A system for detecting a global positioning system (GPS) spoofing attack on a navigational unit, comprising:
a GPS receiver and an inertial navigational system (INS) device operatively associated with said GPS receiver; and
a central processor operatively connected to the GPS receiver and INS device, said central processor being programmed to perform the steps of:
collecting sequentially a series of navigational data comprising a GPS reading from the GPS receiver and INS reading from the INS device at periodic intervals; and
statistically analyzing via hypothesis testing the GPS and INS readings of the corresponding navigational data until either a statistically significant difference between the GPS and INS readings can be determined to signals the presence of a GPS spoofing attack, or the difference between the GPS and INS readings are statistically the same to signals the absence of a GPS spoofing attack.

16. The system of claim 15, wherein the analyzing step comprises:
selecting a lower detection threshold corresponding to a first statistical significance level wherein a GPS spoofing attack is deemed absent, and a higher detection threshold corresponding to a second statistical significance level wherein a GPS spoofing attack is deemed present;
determining a test statistic from each navigational data collected at each interval;
determining a probability value from each of the test statistics; and
comparing the probability value corresponding to each test statistic with the lower detection threshold and the higher detection threshold, respectively, until an outcome corresponding to the presence or absence of a GPS spoofing attack can be established.

17. The method of claim 16, wherein one of the outcomes comprises:
continuing the collection of navigational data under the condition that the test statistic is less than the upper statistical significance level, and greater than the lower statistical significance level.

18. The method of claim 16, wherein one of the outcomes comprises:
terminating the collection of navigational data; and
signaling the presence of a GPS spoofing attack under the condition that the test statistic is greater than or equal to the upper statistical significance level.

19. The method of claim 16, wherein one of the outcomes comprises:
terminating the collection of navigational data; and
signaling the absence of a GPS spoofing attack under the condition that the test statistic is lesser than or equal to the lower statistical significance level.

20. The system of claim 13, wherein the hypothesis test is a sequential probability ratio test.

21. The system of claim 16, wherein the test statistic ($\Delta_i$) is determined using Eq. (3) as follows, $$\Delta_i = |X_{GPS}^i - X_{INS}^i| \qquad (3)$$

wherein:
$X_{GPS}^i$ is the GPS reading from the GPS receiver; and
$X_{INS}^i$ is the INS reading from the INS device.

22. The system of claim 16, wherein the probability value is a cumulative sum of log-likelihood ratio ($\lambda_i$), said cumulative sum of log-likelihood ratio ($\lambda_i$) being determined using Eq. (4) as follows, $$\lambda_i = \lambda_{i-1} + \frac{\log(P(\Delta_i | H_1))}{P(\Delta_i | H_0)} \qquad (4)$$

wherein,
$\lambda_{i-1}$ represents the test statistic the navigational data from previous collection interval,
$H_0$ represents the hypothesis where a GPS spoofing attack is absent,
$H_1$ represents the hypothesis where a GPS spoofing attack is present,
$P(\Delta_i | H_o)$ represents the probability distribution of $\Delta_i$ under hypothesis $H_0$, and
$P(\Delta_i | H_1)$ represents the probability distribution of $\Delta_i$ under hypothesis $H_1$.

* * * * *